United States Patent
Moon et al.

(10) Patent No.: US 8,532,205 B2
(45) Date of Patent: Sep. 10, 2013

(54) FRAME TRANSMISSION METHOD IN A WIRELESS COMMUNICATION SYSTEM

(75) Inventors: Sung Ho Moon, Anyang-si (KR); Minseok Noh, Anyang-si (KR); Yeong Hyeon Kwon, Anyang-si (KR); Jin Sam Kwak, Anyang-si (KR); Dong Cheol Kim, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 397 days.

(21) Appl. No.: 12/933,584

(22) PCT Filed: Mar. 19, 2009

(86) PCT No.: PCT/KR2009/001414
§ 371 (c)(1),
(2), (4) Date: Sep. 20, 2010

(87) PCT Pub. No.: WO2009/116821
PCT Pub. Date: Sep. 24, 2009

(65) Prior Publication Data
US 2011/0007831 A1    Jan. 13, 2011

Related U.S. Application Data

(60) Provisional application No. 61/037,709, filed on Mar. 19, 2008, provisional application No. 61/039,433, filed on Mar. 26, 2008.

(30) Foreign Application Priority Data

Jul. 25, 2008 (KR) .......................... 10-2008-0073148

(51) Int. Cl.
*H04K 1/10* (2006.01)

(52) U.S. Cl.
USPC ........... 375/260; 375/259; 375/316; 375/219; 375/295; 370/280; 370/294; 370/314; 370/321; 370/474

(58) Field of Classification Search
USPC ......... 375/260, 259, 316, 219, 295; 370/280, 370/294, 314, 321, 474, 476
See application file for complete search history.

(56) References Cited

U.S. PATENT DOCUMENTS

2007/0258358 A1* 11/2007 Cho et al. ...................... 370/208

FOREIGN PATENT DOCUMENTS

KR    10-2006-0073257 A    6/2006

* cited by examiner

*Primary Examiner* — Zewdu Kassa (74) *Attorney, Agent, or Firm* — Birch, Stewart, Kolasch, Birch, LLP (57) ABSTRACT

A frame transmission method in a wireless communication system comprises setting a primary frame including a multiplicity of primary sub-frames, setting a secondary frame including a multiplicity of secondary sub-frames, and transmitting the secondary frame, wherein each of the primary sub-frames and each of the secondary sub-frames consists of multiple OFDM symbols, the OFDM symbols included in the primary sub-frame and the OFDM symbols included in the secondary sub-frame have different CP (Cyclic Prefix) lengths from one another, and the primary sub-frames and the secondary sub-frames are all equal in length. It is an advantage of the invention that frames consisting of OFDM symbols with different CP lengths can coexist together. Moreover, when each of the sub-frames within one frame consists of multiple OFDM symbols with different CP lengths, even the sub-frames can coexist together.

8 Claims, 8 Drawing Sheets

SF_k:Kth Subframe

FRAME TRANSMISSION METHOD IN A WIRELESS COMMUNICATION SYSTEM

CROSS REFERENCE TO RELATED APPLICATIONS

This application is the National Phase of PCT/KR2009/001414 filed on Mar. 19, 2009, which claims priority under 35 U.S.C. 119(e) to U.S. Provisional Application No. 61/037,709 filed on Mar. 19, 2008 and U.S. Provisional Application No. 61/039,433 filed on Mar. 26, 2008 and under 35 U.S.C. 119(a) to Patent Application No. 10-2008-0073148 filed in Republic of Korean on Jul. 25, 2008, all of which are hereby expressly incorporated by reference into the present application.

BACKGROUND OF THE INVENTION

1. Field of the Invention

The present invention relates to wireless communications, and more particularly, to a method of transmitting a frame consisting of orthogonal frequency-division multiplexing (OFDM) symbols having various cyclic prefix (CP) lengths for each subframe in a wireless communication system.

2. Related Art

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

Recently, standardization on the IEEE 802.16m is in progress as a new technical standard based on the IEEE 802.16e. The IEEE 802.16m, which is a newly developed technical standard, has to be designed to support the previously designed IEEE 802.16e. That is, a technology (i.e., IEEE 802.16m) of a newly designed system has to be configured to operate by effectively incorporating a conventional technology (i.e., IEEE 802.16e). This is referred to as backward compatibility.

A base station (BS) employing a new technology performs scheduling on a radio resource with respect to a legacy user equipment (UE) or a UE employing the new technology at a bandwidth that can be supported by the BS. Scheduling of the radio resource can be performed in a logical frame consisting of a plurality of OFDM symbols in a time domain and a plurality of subchannels in a frequency domain. Therefore, there is on-going research on a frame structure in which an IEEE 802.16m system can satisfy backward compatibility with respect to an IEEE 802.16e system.

At present, as a frame structure in which the IEEE 802.16m system can satisfy backward compatibility with respect to the IEEE 802.16e system, a frame structure consisting of an OFDM symbol of which a cyclic prefix (CP) length is ⅛ times of a useful symbol time Tu is proposed. However, a frame structure consisting of an OFDM symbol having another CP length other than the ⅛ times of the useful symbol time is not clearly proposed yet.

Accordingly, when an IEEE 802.16m system supporting a frame structure consisting of an OFDM symbol having another CP length other than ⅛ Tu exists in a neighbor cell, there is a need to design the frame structure such that interference does not occur between systems in neighboring cells. In addition, there is a need to design the frame structure such that frame structures consisting of OFDM symbols having different CP lengths coexist in the same cell or subframe structures consisting of OFDM symbols having different CP lengths coexist in one frame.

SUMMARY OF THE INVENTION

The present invention provides a subframe structure consisting of orthogonal frequency-division multiplexing (OFDM) symbols having various cyclic prefix (CP) lengths.

In an aspect, a method of transmitting a frame in a wireless communication system is provided. The method include configuring a first frame including a plurality of first subframes, configuring a second frame including plurality of second subframes, and transmitting the second frame, wherein the first subframe and the second subframe include a plurality of orthogonal frequency division multiplexing (OFDM) symbols, an OFDM symbol included in the first subframe and an OFDM symbol included in the second subframe have different cyclic prefix (CP) lengths with each other, and the first subframe and the second subframe have the same length.

In another aspect, a method of transmitting a frame in a wireless communication system is provided. The method include configuring a frame including a plurality of subframes, and transmitting the frame, wherein the subframe comprises a plurality of orthogonal frequency-division multiplexing (OFDM) symbols, a cyclic prefix (CP) length of the OFDM symbol included in the subframe is selected independently for each subframe, and the plurality of subframes have the same length.

DESCRIPTION OF EXEMPLARY EMBODIMENTS

Figure 1:
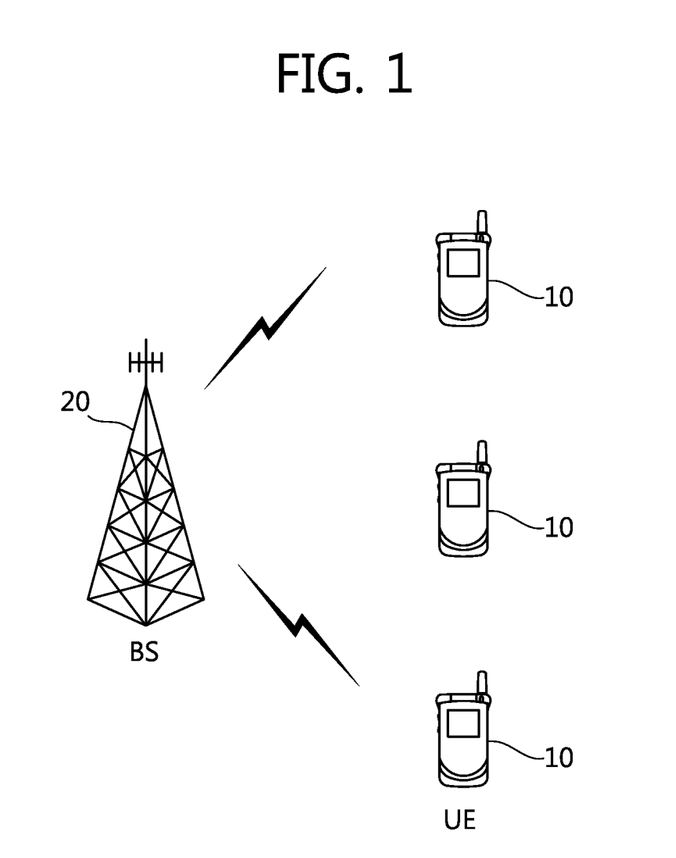
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

There is no restriction on the multiple access scheme used in the wireless communication system. Examples of the multiple access scheme are various, such as code division multiple access (CDMA), time division multiple access (TDMA), frequency division multiple access (FDMA), single-carrier FDMA (SC-FDMA), and orthogonal frequency division multiple access (OFDMA).

The BS 20 has at least one cell. The cell is an area in which the BS 20 provides a communication service. Different communication schemes can be used in one cell. That is, heterogeneous wireless communication systems may exist while sharing a communication service area. Hereinafter, the heterogeneous wireless communication systems or heterogeneous systems refer to systems using different communication schemes. For example, the heterogeneous systems may be systems using different access schemes, or may be a legacy system and an evolution system supporting backward compatibility with the legacy system.

Figure 2:
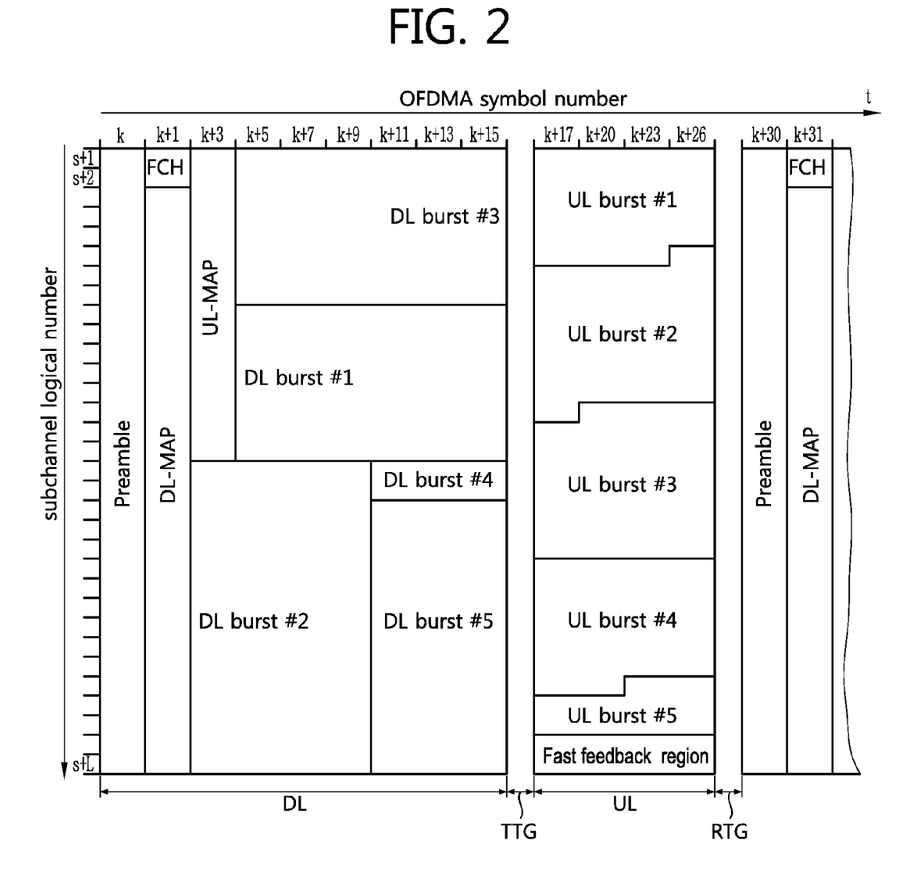
FIG. 2 shows an example of a frame structure.

FIG. 2 shows an example of a frame structure. A frame is a data sequence used according to a physical specification in a fixed time duration. The frame is a logical frame, and section 8.4.4.2 of the IEEE standard 802.16-2004 "Part 16: Air Interface for Fixed Broadband Wireless Access Systems" can be incorporated herein by reference.

Referring to FIG. 2, the frame includes a downlink (DL) frame and an uplink (UL) frame. DL transmission is performed using the DL frame, and UL transmission is performed using the UL frame. When using a time division duplex (TDD) scheme, the UL and DL transmissions are achieved at different times while sharing the same frequency band. The DL frame temporally precedes the UL frame. The DL frame sequentially includes a preamble, a frame control header (FCH), a DL-MAP, a UL-MAP, and a burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a DL burst and a subsequent UL burst. A receive/transmit transition gap (RTG) is a gap between a UL burst and a subsequent DL burst.

The preamble is used between a BS and a UE for initial synchronization, cell search, and frequency-offset and channel estimation. The FCH includes information on a length of a DL-MAP message and a coding scheme of the DL-MAP.

The DL-MAP is a region for transmitting the DL-MAP message. The DL-MAP message defines access to a DL channel. The DL-MAP message includes a configuration change count of a downlink channel descriptor (DCD) and a BS identifier (ID). The DCD describes a downlink burst profile applied to a current MAP. The downlink burst profile indicates characteristics of a DL physical channel. The DCD is periodically transmitted by the BS by using a DCD message.

The UL-MAP is a region for transmitting a UL-MAP message. The UL-MAP message defines access to a UL channel. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of a UL physical channel and is periodically transmitted by the BS by using a UCD message.

Table 1 shows an example of parameters for a frame.

TABLE 1

| Transmission Bandwidth (MHz) | 5 | 10 | 20 |
|---|---|---|---|
| Over-sampling factor | | 28/25 | |
| Sampling Frequency (MHz) | 5.6 | 11.2 | 22.4 |
| FFT Size | 512 | 1024 | 2048 |
| Sub-carrier Spacing (kHz) | | 10.94 | |
| OFDM symbol time, Tu (us) | | 91.4 | |
| Cyclic Prefix (CP) | Ts (us) | OFDM symbols per Frame | Idle time (us) |
| Tg = 1/4 Tu | 91.4 + 22.85 = 114.25 | 43 | 87.25 |
| Tg = 1/8 Tu | 91.4 + 11.42 = 102.82 | 48 | 64.64 |
| Tg = 1/16 Tu | 91.4 + 5.71 = 97.11 | 51 | 47.39 |
| Tg = 1/32 Tu | 91.4 + 2.86 = 94.26 | 53 | 4.22 |

As shown in Table 1 above, an OFDM symbol has a different length according to a CP length.

The OFDM symbol is generated by using inverse Fourier transform. A time duration of the OFDM symbol is denoted by a useful symbol time Tu. A CP is a copy of a final useful symbol time Tg, and can be denoted by a ratio with respect to the useful symbol time Tu. That is, the length of one OFDM symbol is the sum of the CP length and the useful symbol time Tu.

Hereinafter, a time division duplexing (TDD) frame structure in which some of the parameters proposed in Table 1 above are extracted is defined as a frame structure of a legacy system. Herein, the TDD frame denotes a frame in which UL and DL are divided in a time domain while a full frequency band is used for UL or DL. The legacy system may imply a wireless communication system using the IEEE 802.16e standard technique, and the new system may imply a wireless communication system using the IEEE 802.16m standard technique. In a frame of the legacy system, a CP length of an OFDM symbol constituting the frame is ⅛ times of the useful symbol time Tu, and control information such as a preamble, an FCH, a DL-MAP, etc., is defined according to the IEEE 802.16e standard. The preamble, the FCH, and the DL-MAP can be referred to as essential control information required by a UE to perform communication by accessing a system network. The frame may have a size of 5 ms. The essential control information is allocated first temporally in the frame.

Figure 3:
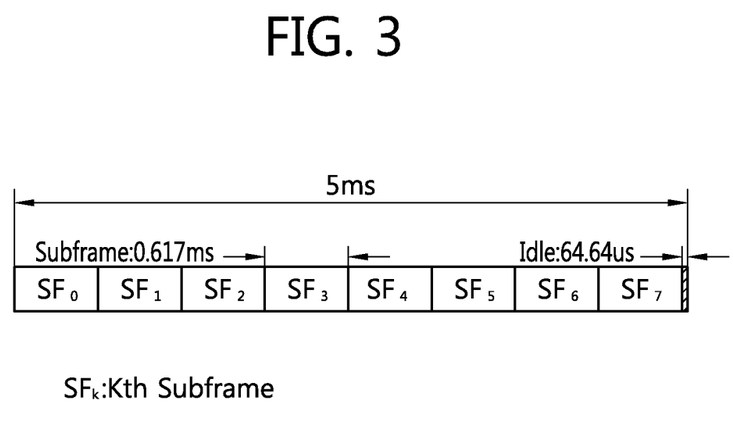
FIG. 3 shows an example of a TDD frame which consists of an OFDM symbol having a CP length of ⅛ Tu and which supports a new system while having similarity with a TDD frame structure of a legacy system.

FIG. 3 shows an example of a TDD frame which consists of an OFDM symbol having a CP length of ⅛ Tu and which supports a new system while having similarity with a TDD frame structure of a legacy system.

Referring to FIG. 3, the frame has a length of 5 ms, and includes 8 subframes and an idle time. One subframe has a length of 0.617 ms, and includes 6 OFDM symbols. Herein, $SF_k$ denotes a $k^{th}$ subframe. Although the TDD frame structure is shown in FIG. 3, a frequency division duplexing (FDD) frame structure has similarity with the TDD frame structure. In the FDD frame, UL transmission and DL transmission are performed simultaneously while occupying different frequency bands.

As shown in FIG. 3, when 6 OFDM symbols constitute one subframe, a ratio of a DL duration and a UL duration can be effectively configured in the TDD frame, the number of OFDM symbols of the UL duration can be set to a multiple of 3, and data delay can be reduced.

In addition, if a frame consists of an OFDM symbol having a CP length of ⅛ Tu similarly to the frame structure of the legacy system, the frame structure of the legacy system and the frame structure of the new system have an overlapping TTG duration, and thus interference between UEs located in a cell edge can be avoided when the legacy system and the new system coexist between neighboring cells.

However, FIG. 3 shows an example of a frame consisting of an OFDM symbol having a CP length of ⅛ Tu. If a new system considering a frame structure consisting of an OFDM symbol having another CP length other than ⅛ Tu exists in a neighboring cell, similarity between frames is required in order for coexistence of the two systems. In addition, frame design is achieved such that frames consisting of OFDM symbols having different CP lengths coexist in one cell, or subframes consisting of OFDM symbols having different CP lengths coexist in one frame.

The frame supporting the new system includes a plurality of subframes divided in a specific-sized duration. In general, data allocation and scheduling are performed in a subframe unit. In addition, in the TDD frame, a DL duration and a UL duration can be divided in the subframe unit. One subframe consists of OFDM symbols having the same CP length. Each subframe may consist of an OFDM symbol having a different CP length. Therefore, to satisfy coexistence without mutual interference with a frame consisting of an OFDM symbol having a CP length of ⅛ Tu between the legacy system and the new system, it can be considered to allow a subframe consisting of OFDM symbols having various CP lengths to have similarity with a subframe for constituting a frame consisting of an OFDM symbol having a CP length of ⅛ Tu. That is, the present invention proposes a subframe structure in which all subframes are configured to have the same length irrespective of a CP length so as to satisfy coexistence between frames or subframes even if a CP length is different.

Hereinafter, various embodiments in which subframes consisting of OFDM symbols having various CP lengths are configured to have the same length will be described.

FIG. 4 to FIG. 8 shows examples where a transmission bandwidth is 10 MHz. Referring to Table 1 above, when the transmission bandwidth is 10 MHz, a sampling frequency is 11.2 MHz, and thus one sample interval is 1/11.2 MHz=89.2 ns. Although the TDD frame structure is exemplified in FIG. 4 to FIG. 8, the present invention can equally apply to the FDD frame structure.

Figure 4:
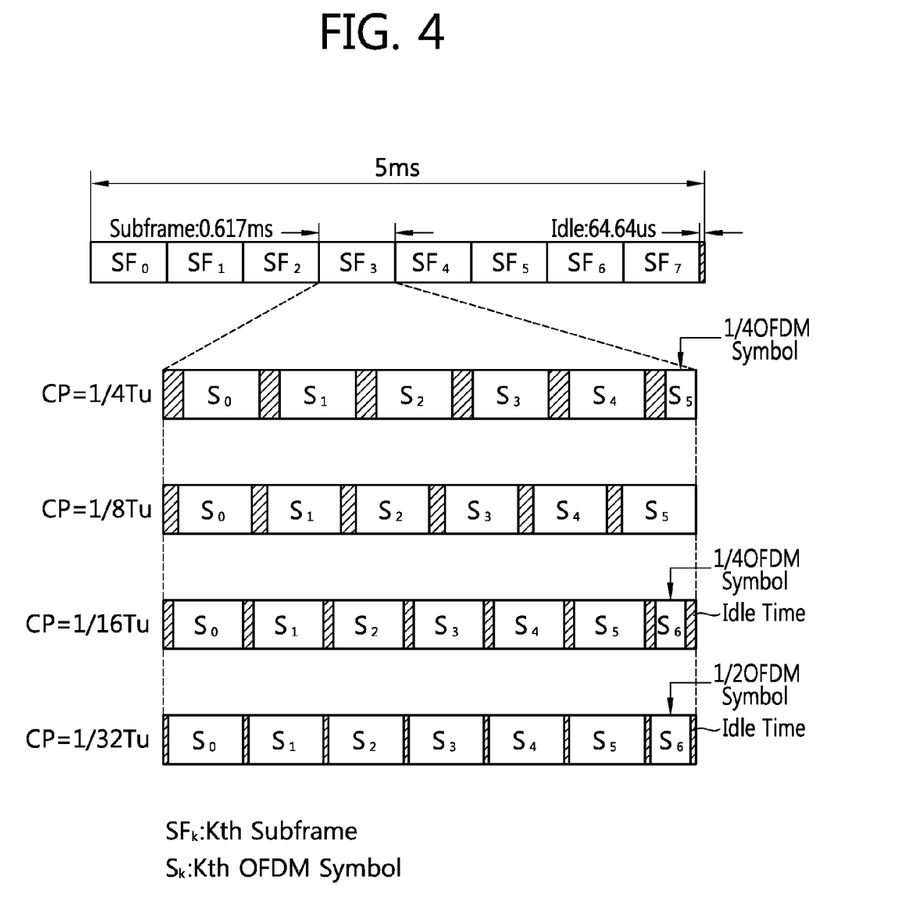
FIG. 4 shows a subframe structure according to an embodiment of the present invention.

FIG. 4 shows a subframe structure according to an embodiment of the present invention. Herein, $SF_k$ denotes a $k^{th}$ subframe, and $S_k$ denotes a $k^{th}$ OFDM symbol in a subframe.

Referring to FIG. 4, a subframe consisting of an OFDM symbol having a CP length of ⅛ Tu is configured with 6 OFDM symbols, and a subframe consisting of an OFDM symbol having a different CP length is configured to have the same length of a subframe consisting of an OFDM symbol having a CP length of ⅛ Tu. That is, a subframe consisting of an OFDM symbol having a CP length other than ⅛ Tu may include an OFDM symbol fraction and an idle duration in order to adjust to the length of the OFDM symbol having the CP length of ⅛ Tu. For example, a subframe consisting of an OFDM symbol having a CP length of ¼ Tu includes 5 OFDM symbols and a ¼ OFDM symbol fraction, a subframe consisting of an OFDM symbol having a CP length of 1/16 Tu includes 6 OFDM symbols, a ¼ OFDM symbol fraction, and an idle duration of 64 samples, and a subframe consisting of an OFDM symbol having a CP length of 1/32 Tu includes 6 OFDM symbols, a ½ OFDM symbol fraction, and an idle duration of 32 samples. Herein, the CP length of the OFDM symbol fraction is equal to the CP length of the OFDM symbol constituting the subframe including the OFDM symbol fraction.

In the subframes consisting of the OFDM symbols having the CP lengths of ¼ Tu, 1/16 Tu, and 1/32 Tu shown in FIG. 4, the OFDM symbol fraction or the idle duration is located in an end portion temporally in a frame. However, the present invention is not limited thereto, and thus the OFDM symbol fraction or the idle duration may be located in a front portion of the subframe or between OFDM symbols.

Table 2 shows a configuration of a subframe based on FIG. 4.

TABLE 2

| CP Length (Tu = 1024 Samples) | CP Duration (Samples) | Number of Samples(10 MHz) m/n = CP Length/Useful OFDM Symbol Length | | | | | | | Idle Per Subframe |
|---|---|---|---|---|---|---|---|---|---|
| | | #0 | #1 | #2 | #3 | #4 | #5 | #6 | |
| 1/8 Tu | 128 | 128/1024 | 128/1024 | 128/1024 | 124/1024 | 128/1024 | 128/1024 | N/A | 0 |
| 1/4 Tu | 256 | 256/1024 | 256/1024 | 256/1024 | 256/1024 | 256/1024 | 256/256 | N/A | 0 |
| 1/16 Tu | 64 | 64/1024 | 64/1024 | 64/1024 | 64/1024 | 64/1024 | 64/1024 | 64/256 | 64 |
| 1/32 Tu | 32 | 32/1024 | 32/1024 | 32/1024 | 32/1024 | 32/1024 | 32/1024 | 32/512 | 32 |

Although the OFDM symbol fraction is located in a $6^{th}$ symbol duration in Table 2, this is for exemplary purposes only, and thus the OFDM symbol fraction can be located in any symbol duration.

Figure 5:
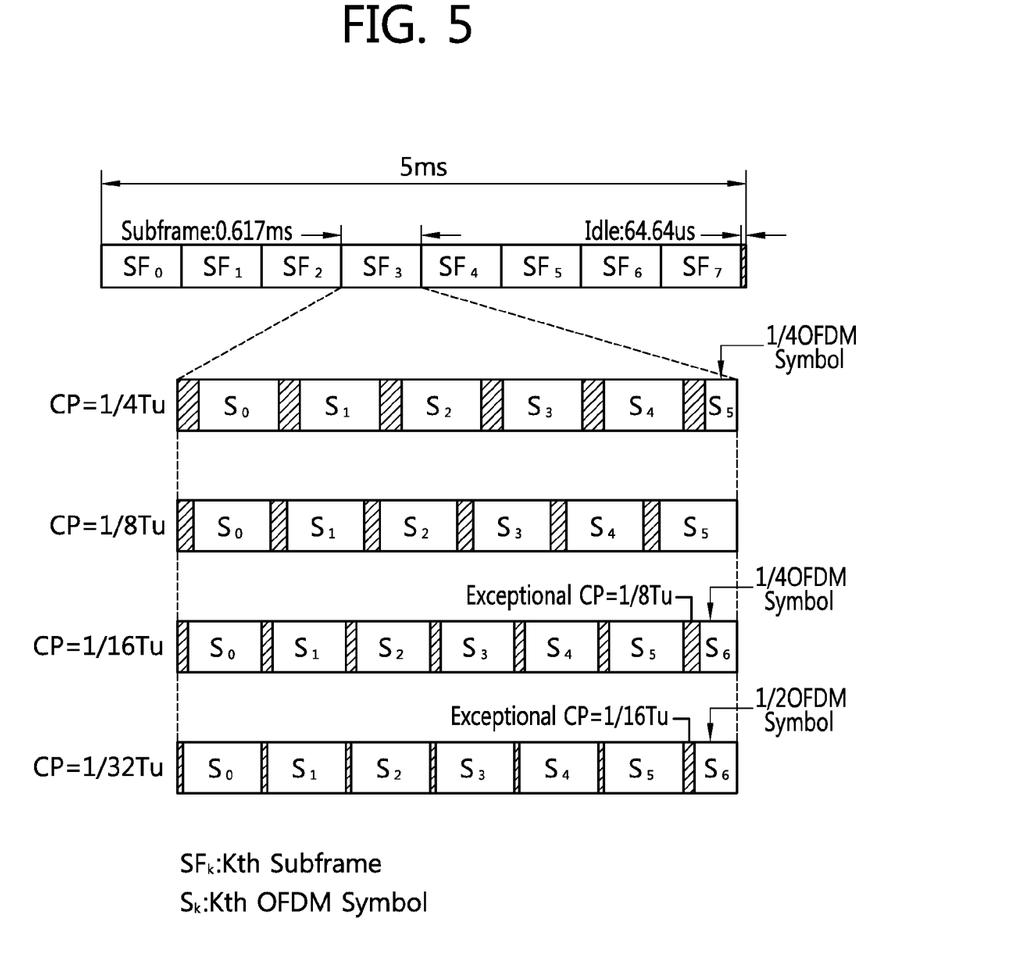
FIG. 5 shows another subframe structure according to an embodiment of the present invention.

FIG. 5 shows a subframe structure according to another embodiment of the present invention. Herein, $SF_k$ denotes a $k^{th}$ subframe, and $S_k$ denotes a $k^{th}$ OFDM symbol in a subframe.

Referring to FIG. 5, the frame structure is the same as the subframe structure of FIG. 4, except for an idle duration of subframes consisting of OFDM symbols having CP lengths of 1/16 Tu and 1/32 Tu. Herein, a duration corresponding to the idle duration of FIG. 4 can be used as a CP duration of any OFDM symbol in the subframe. For example, the duration corresponding to the idle duration of FIG. 4 may be located in front of a ¼ OFDM symbol fraction of a subframe consisting of an OFDM symbol having a CP length of 1/16 Tu and in front of a ½ OFDM symbol fraction of a subframe consisting of an OFDM symbol having a CP length of 1/32 Tu. Therefore, the CP length of the OFDM symbol fraction is two times higher than the CP length of the OFDM symbol constituting the subframe including the OFDM symbol fraction.

Although the duration corresponding to the idle duration is located in front of the OFDM symbol fraction in FIG. 5, the present invention is not limited thereto, and thus the duration may be located in front of another OFDM symbol. In addition, although the OFDM symbol fraction is located in a $6^{th}$ symbol duration, the present invention is not limited thereto, and thus the OFDM symbol fraction can be located in any symbol duration.

Table 3 shows a configuration of a subframe based on FIG. 5.

TABLE 3

| CP Length (Tu = 1024 Samples) | CP Duration (Samples) | Number of Samples(10 MHz) m/n = CP Length/Useful OFDM Symbol Length | | | | | | | Idle Per Subframe |
|---|---|---|---|---|---|---|---|---|---|
| | | #0 | #1 | #2 | #3 | #4 | #5 | #6 | |
| 1/8 Tu | 128 | 128/1024 | 128/1024 | 128/1024 | 124/1024 | 128/1024 | 128/1024 | N/A | 0 |
| 1/4 Tu | 256 | 256/1024 | 256/1024 | 256/1024 | 256/1024 | 256/1024 | 256/256 | N/A | 0 |
| 1/16 Tu | 64 | 64/1024 | 64/1024 | 64/1024 | 64/1024 | 64/1024 | 64/1024 | 128/256 | 0 |
| 1/32 Tu | 32 | 32/1024 | 32/1024 | 32/1024 | 32/1024 | 32/1024 | 32/1024 | 64/512 | 0 |

Figure 6:
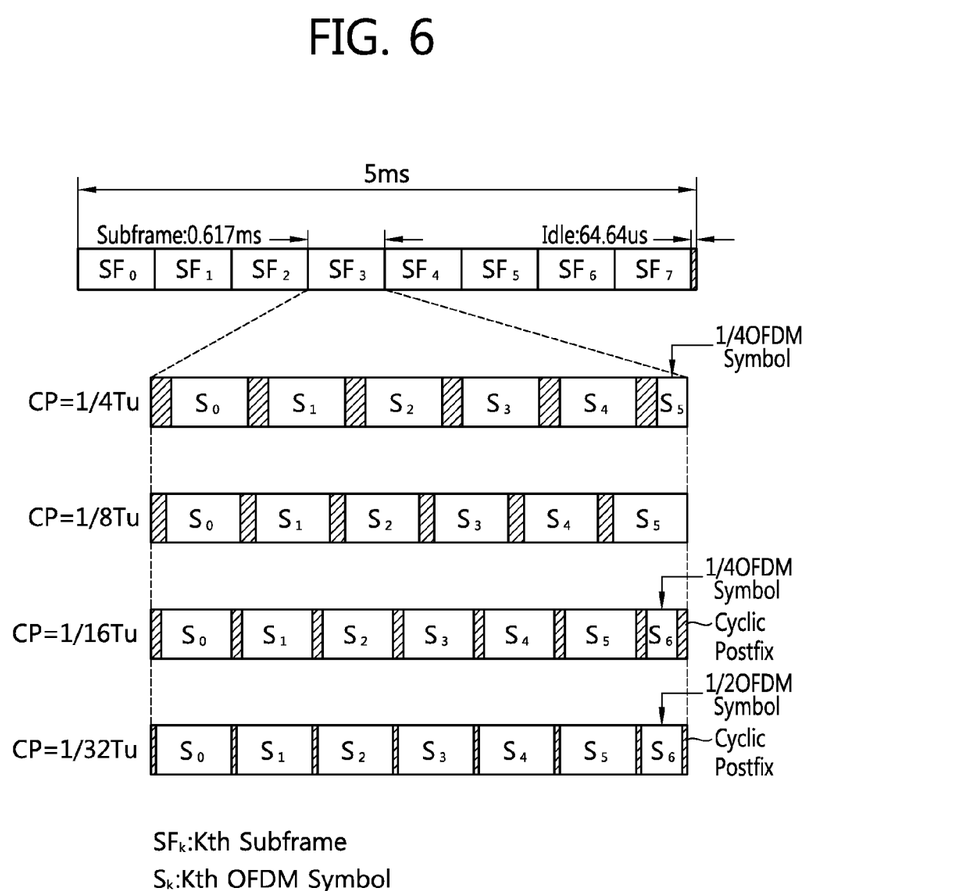
FIG. 6 shows another subframe structure according to an embodiment of the present invention.

FIG. 6 shows a subframe structure according to another embodiment of the present invention. Herein, $SF_k$ denotes a $k^{th}$ subframe, and $S_k$ denotes a $k^{th}$ OFDM symbol in a subframe.

Referring to FIG. 6, the frame structure is the same as the subframe structure of FIG. 4, except for an idle duration of subframe consisting of OFDM symbols having CP lengths of 1/16 Tu and 1/32 Tu. Herein, a duration corresponding to the idle duration of FIG. 4 can be used as a cyclic postfix of any OFDM symbol in the subframe. For example, the cyclic postfix may be located behind a 1/4 OFDM symbol fraction of a subframe consisting of an OFDM symbol having a CP length of 1/16 Tu and a 1/2 OFDM symbol fraction of a subframe consisting of an OFDM symbol having a CP length of 1/32 Tu. However, the present invention is not limited thereto, and thus the duration corresponding to the idle duration may be configured with a cyclic postfix of another OFDM symbol in the subframe. In addition, although the OFDM symbol fraction is located in the $6^{th}$ symbol duration, the present invention is not limited thereto, and thus the OFDM symbol can be located in any symbol duration.

Figure 7:
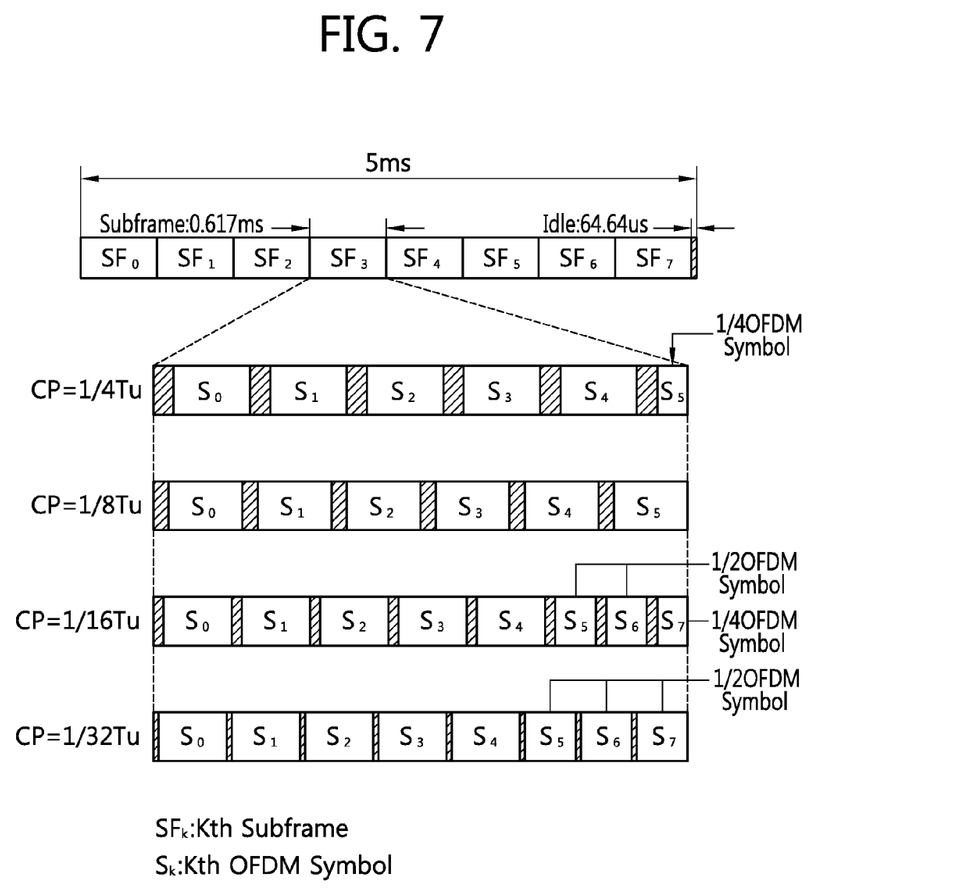
FIG. 7 shows another subframe structure according to an embodiment of the present invention.

Table 4 shows a configuration of a subframe based on FIG. 6.

subframes consisting of OFDM symbols having CP lengths of 1/16 Tu and 1/32 Tu. Herein, a plurality of OFDM symbol fractions can be deployed in the subframes consisting of OFDM symbols having CP lengths of 1/16 Tu and 1/32 Tu, so that a duration corresponding to the idle duration of FIG. 4 can be used as a CP duration of the OFDM symbol fraction. For example, the subframe consisting of an OFDM symbol having a CP length of 1/16 Tu includes 5 OFDM symbols, two 1/2 OFDM symbol fractions, and one 1/4 OFDM symbol fraction, and the subframe consisting of an OFDM symbol having a CP length of 1/32 Tu includes 5 OFDM symbols and 3 1/2 OFDM symbol fractions. Herein, the CP length of the OFDM symbol fraction is equal to the CP length of the OFDM symbol constituting the subframe including the OFDM symbol fraction.

Although the OFDM symbol fractions are located in $5^{th}$, $6^{th}$, and $7^{th}$ symbol durations in the subframe consisting of the OFDM symbols having a CP lengths of 1/16 Tu and 1/32 Tu, the present invention is not limited thereto, and thus the OFDM symbol fractions can be located in any symbol duration in the subframe.

Table 5 shows a configuration of a subframe based on FIG. 7.

TABLE 4

| CP Length (Tu = 1024 Samples) | CP Duration (Samples) | Number of Samples(10 MHz) m/n = CP Length/Useful OFDM Symbol Length | | | | | | | Idle Per Subframe |
|---|---|---|---|---|---|---|---|---|---|
| | | #0 | #1 | #2 | #3 | #4 | #5 | #6 | |
| 1/8 Tu | 128 | 128/1024 | 128/1024 | 128/1024 | 124/1024 | 128/1024 | 128/1024 | N/A | 0 |
| 1/4 Tu | 256 | 256/1024 | 256/1024 | 256/1024 | 256/1024 | 256/1024 | 256/256 | N/A | 0 |
| 1/16 Tu | 64 | 64/1024 | 64/1024 | 64/1024 | 64/1024 | 64/1024 | 64/1024 | 64/256/64 | 0 |
| 1/32 Tu | 32 | 32/1024 | 32/1024 | 32/1024 | 32/1024 | 32/1024 | 32/1024 | 32/512/32 | 0 |

FIG. 7 shows a subframe structure according to another embodiment of the present invention. Herein, $SF_k$ denotes a $k^{th}$ subframe, and $S_k$ denotes a $k^{th}$ OFDM symbol in a subframe.

Referring to FIG. 7, the frame structure is the same as the subframe structure of FIG. 4, except for an idle duration of

TABLE 5

| CP Length (Tu = 1024 Samples) | CP Duration (Samples) | Number of Samples(10 MHz) m/n = CP Length/Useful OFDM Symbol Length | | | | | | | | Idle Per Subframe |
|---|---|---|---|---|---|---|---|---|---|---|
| | | #0 | #1 | #2 | #3 | #4 | #5 | #6 | #7 | |
| 1/8 Tu | 128 | 128/1024 | 128/1024 | 128/1024 | 124/1024 | 128/1024 | 128/1024 | N/A | N/A | 0 |
| 1/4 Tu | 256 | 256/1024 | 256/1024 | 256/1024 | 256/1024 | 256/1024 | 256/256 | N/A | N/A | 0 |
| 1/16 Tu | 64 | 64/1024 | 64/1024 | 64/1024 | 64/1024 | 64/1024 | 64/512 | 64/512 | 64/256 | 0 |
| 1/32 Tu | 32 | 32/1024 | 32/1024 | 32/1024 | 32/1024 | 32/1024 | 32/512 | 32/512 | 32/512 | 0 |

Figure 8:
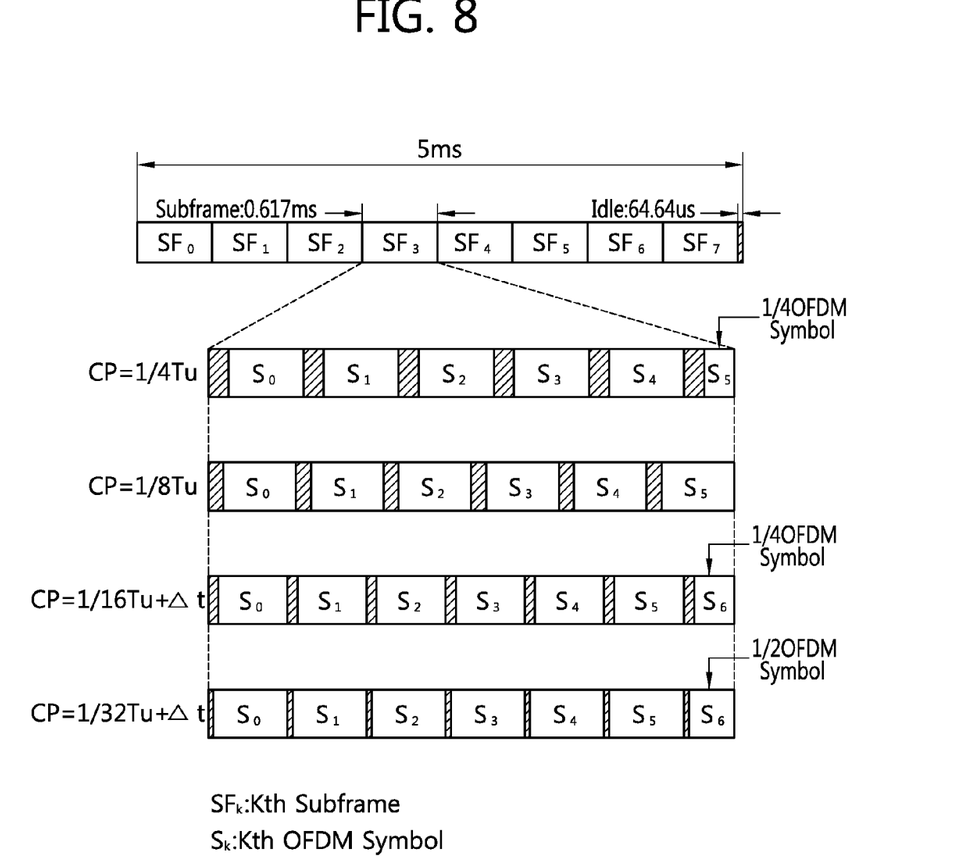
FIG. 8 shows another subframe structure according to an embodiment of the present invention.

FIG. 8 shows a subframe structure according to another embodiment of the present invention. Herein, $SF_k$ denotes a $k^{th}$ subframe, and $S_k$ denotes a $k^{th}$ OFDM symbol in a subframe.

Referring to FIG. 8, the frame structure is the same as the subframe structure of FIG. 4, except for an idle duration of subframes consisting of OFDM symbols having CP lengths of 1/16 Tu and 1/32 Tu. Herein, a duration corresponding to the idle duration of FIG. 4 can be further allocated as a CP duration of the OFDM symbol in the subframe. That is, the CP length can be set to 1/16 Tu+Δt and 1/32 Tu+Δt.

For example, a CP length of a subframe consisting of an OFDM symbol having a CP length of 1/16 Tu is configured with 73 samples which are increased by 9 samples from an original CP length, i.e., 64 samples, and only one CP length is configured with 74 samples. Herein, the 74 samples may be a CP length of any OFDM symbol or OFDM symbol fraction in the subframe.

The subframe consisting of the OFDM symbol having a CP length of 1/32 Tu is configured by using two methods. In a first method, 6 CP lengths are configured with 36 samples which are increased by 4 samples from an original CP length, i.e., 32 samples, and one CP length is configured with 40 samples. In a second method, 6 CP lengths are configured with 37 samples, and one CP length is configured with 34 samples. Herein, the 40 samples or the 34 samples may be a length of any OFDM symbol or OFDM symbol fraction in the subframe.

Table 6 shows a subframe configuration based on FIG. 8

TABLE 6

| CP Length (Tu = 1024 Samples) | CP Duration (Samples) | Number of Samples(10 MHz) m/n = CP Length/Useful OFDM Symbol Length | | | | | | | Idle per Subframe |
|---|---|---|---|---|---|---|---|---|---|
| | | #0 | #1 | #2 | #3 | #4 | #5 | #6 | |
| 1/8 Tu | 128 | 128/1024 | 128/1024 | 128/1024 | 128/1024 | 128/1024 | 128/1024 | N/A | 0 |
| 1/4 Tu | 256 | 256/1024 | 256/1024 | 256/1024 | 256/1024 | 256/1024 | 256/256 | N/A | 0 |
| 1/16 Tu + Δt | 73 or 74 | 73/1024 | 73/1024 | 73/1024 | 73/1024 | 73/1024 | 73/1024 | 74/256 | 0 |
| 1/32 Tu + Δt (Option 1) | 36 or 40 | 36/1024 | 36/1024 | 36/1024 | 36/1024 | 36/1024 | 36/1024 | 40/512 | 0 |
| 1/32 Tu + Δt (Option 2) | 37 or 34 | 37/1024 | 37/1024 | 37/1024 | 37/1024 | 37/1024 | 37/1024 | 34/512 | 0 |

Although a CP length of a $6^{th}$ symbol is different from a CP length of another symbol, the present invention is not limited thereto.

Although the idle duration is included in FIG. 4, the idle duration is used as a CP or a cyclic postfix in FIG. 5 to FIG. 8. Accordingly, discontinuous transmission is avoided in a radio frequency (RF) side, and thus transmission efficiency can increase.

According to FIG. 4 to FIG. 8, a subframe is configured to have the same length of the subframe consisting of the OFDM symbol having a CP length of 1/8 Tu of FIG. 3. Therefore, mutual coexistence between subframes consisting of OFDM symbols having different CP lengths can be satisfied.

The examples of FIG. 4 to FIG. 8 are for the case where the transmission bandwidth is 10 MHz. Referring to Table 1, if the transmission bandwidth is 5 MHz, a sampling frequency is 1/2 times of 10 MHz, and thus one sample is two times of 10 MHz, and if the transmission bandwidth is 20 MHz, the sample frequency is two times of 10 MHz, and thus one sample is 1/2 times of 10 MHz. Therefore, the present invention is not limited to the transmission bandwidth of 10 MHz, and can be utilized for various transmission bandwidths.

According to the present invention, coexistence may be satisfied between frames consisting of an OFDM symbol having various CP lengths. In addition, when each subframe consists of an OFDM symbol having various CP lengths in a frame, coexistence may be satisfied between subframes.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting a subframe in a wireless communication system, the method comprising:

configuring a first subframe including six orthogonal frequency division multiplexing (OFDM) symbols, a cyclic prefix (CP) length of each OFDM symbol included in the first subframe being 1/8 times of a useful symbol time of each OFDM symbol included in the first subframe;

configuring a second subframe including a plurality of OFDM symbols and at least one fraction of one OFDM symbol, a CP length of each OFDM symbol included in the second subframe being a length other than 1/8 times of a useful symbol time of each OFDM symbol in the second subframe; and transmitting the first subframe and the second subframe, wherein the first subframe and the second subframe have the same length irrespective of the CP length of each OFDM symbol included in the second subframe.

2. The method of claim 1, wherein the CP length of each OFDM symbol included in the second subframe is one of 1/4 times, 1/16 times, or 1/32 times of the useful symbol time of each OFDM symbol in the second subframe.

3. The method of claim 1, wherein
the second subframe further includes an idle time, and
wherein a length of the idle time in the second subframe is the same as the CP length of each OFDM symbol included in the second subframe.

4. The method of claim 1, wherein the second subframe further includes a cyclic postfix, and
wherein a length of the cyclic postfix in the second subframe is the same as the CP length of each OFDM symbol included in the second subframe.

5. The method of claim 1, wherein a CP length of the at least one fraction of one OFDM symbol is different from the CP length of each OFDM symbol included in the second subframe.

6. The method of claim 1, wherein the first subframe and the second subframe are one of a downlink subframe or an uplink subframe.

7. The method of claim 1, wherein the first subframe and the second subframe are included either in a time division duplex (TDD) frame or a frequency division duplex (FDD) frame.

8. A base station in a wireless communication system, the base station comprising:
   a radio frequency (RF) unit; and
   a processor configured for:
   configuring a first subframe including six orthogonal frequency division multiplexing (OFDM) symbols, a cyclic prefix (CP) length of each OFDM symbol included in the first subframe being $1/8$ times of a useful symbol time of each OFDM symbol included in the first subframe;
   configuring a second subframe including a plurality of OFDM symbols and at least one fraction of one OFDM symbol, a CP length of each OFDM symbol included in the second subframe being a length other than $1/8$ times of a useful symbol time of each OFDM symbol in the second subframe; and
   transmitting the first subframe and the second subframe,
   wherein the first subframe and the second subframe have the same length irrespective of the CP length of each OFDM symbol included in the second subframe.

* * * * *